Patented Dec. 5, 1944

2,364,414

UNITED STATES PATENT OFFICE 2,364,414

SULPHUR COMPOUNDS

Michael Henry Miller Arnold and William Eric Perry, Norton-on-Tees, England, assignors to Imperial Chemical Industries Limited, a corporation of Great Britain No Drawing. Application January 12, 1943, Serial No. 472,162. In Great Britain July 25, 1941

12 Claims. (Cl. 167—20)

This invention relates to the production of sulphur compounds, and in particular to the production of compounds containing sulphur and nitrogen.

In co-pending application No. 382,842 there is described a process for the production of mixtures comprising sulphur nitride and iminosulphur ($S_7NH$) by reacting ammonia with one or more chlorides of sulphur dissolved in an organic liquid, the said liquid, after completion of the reaction, being separated from the precipitate and returned to the process. In the early stages of the said process, the reaction tends to be violent and to be accompanied by a rise in temperature such that there occurs considerable loss of the chloride or chlorides of sulphur and to a smaller extent, of organic liquid.

We have now found means whereby control of the reaction is facilitated and whereby the above-mentioned losses of the chloride or chlorides of sulphur and of organic liquid may be decreased and even substantially avoided.

According to the present invention, in the production of mixtures containing sulphur nitride by reacting ammonia with one or more chlorides of sulphur dissolved in an organic liquid, the reaction is carried out from its commencement in the presence of added sulphur nitride which is preferably obtained from previously completed reaction between ammonia and one or more chlorides of sulphur dissolved in an organic liquid.

While the quantity of sulphur nitride to be used according to the present invention may vary over wide limits, we have found it advantageous to provide for the presence of added sulphur nitride equal to about 2% to 4% by weight of the chloride or chlorides of sulphur to be reacted with ammonia. It is convenient to add the sulphur nitride to the initial solution of the chloride or chlorides of sulphur dissolved in an organic liquid.

The precipitate from a completed reaction between ammonia and one or more chlorides of sulphur contains sulphur nitride, sulphur and ammonium chloride, and when prepared according to co-pending application No. 382,842 also contains iminosulphur. Such precipitates are suitable for use according to the present invention, but it is preferable to use them after removal of the ammonium chloride they contain.

The process of the present invention is particularly suitable for use when producing mixtures containing sulphur nitride from chlorides of sulphur containing a high proportion of chlorine, for example when operating with a chloride of sulphur containing more than about 65% by weight of chlorine. As illustrated by the following example, particularly good results are obtained with the process of the present invention, when operating with a chloride of sulphur containing 69% of chlorine:

Example 510 grams of dried solid product from a previous reaction between ammonia and a chloride of sulphur and containing 300 grams of sulphur nitride but substantially no ammonium chloride, the remainder being sulphur and iminosulphur, were added to a mixture of 14 kilograms of a chloride of sulphur containing 69% of chlorine with 80 litres of carbon tetrachloride saturated with the products of a previous reaction between ammonia and a chloride of sulphur. Ammonia was passed through the mixture, which was maintained in motion by stirring, until the reaction was complete as judged by the development of a salmon red colour. The reaction proceeded quietly, there was no undue rise in temperature and control of the reaction conditions was easily maintained. After the reaction was complete, the mixture was treated with water to leach out ammonium chloride formed in the reaction, the aqueous layer was removed, ground gypsum was added to the organic layer in a quantity such that the dried solid material would contain 20% by weight of sulphur nitride, and the solids were separated from the organic layer and dried. Excluding the gypsum, the product weighed 4.19 kilograms and contained 2.90 kilograms of sulphur nitride, the net make of which was therefore 2.60 kilograms.

In the above example, other quantities of gypsum may have been added, according to the percentage of sulphur nitride desired in the final dry material, or the addition of gypsum may have been omitted. It is desirable however, to provide for the presence of an inert filler, of which gypsum is an example, in the final dry product, because of the tendency of sulphur nitride, and of mixtures containing a high percentage thereof, to detonate. Instead of gypsum, other inert fillers may be used, for example, anhydrite, chalk, talc, bentonite.

We claim:

1. In a process for the production of mixtures containing sulphur nitride by reacting ammonia with one or more chlorides of sulphur dissolved in an organic liquid, the step of incorporating in the reaction mixture before commencement of the reaction sulphur nitride freed of ammonium chloride.

2. In a process for the production of mixtures containing sulphur nitride by reacting ammonia with one or more chlorides of sulphur dissolved in an organic liquid saturated with the products of a previous reaction between ammonia and a chloride of sulphur, the step of incorporating in the reaction mixture before commencement of the reaction sulphur nitride.

3. A process according to claim 1 in which the quantity of sulphur nitride is equivalent to about 2 to 4% by weight of the chloride of sulphur.

4. A process according to claim 2 in which the quantity of sulphur nitride is equivalent to about 2 to 4% by weight of the chloride of sulphur.

5. A process according to claim 1 in which the chloride of sulphur contains more than 65% by weight of chlorine.

6. A process according to claim 2 in which the chloride of sulphur contains more than 65% by weight of chlorine.

7. A process according to claim 1 in which the organic liquid is carbon tetrachloride.

8. A process according to claim 2 in which the organic liquid is carbon tetrachloride.

9. In a process for the production of mixtures containing sulphur nitride by reacting ammonia with chloride of sulphur containing more than 65% by weight of chlorine dissolved in an organic liquid, the step of incorporating in the reaction mixture before commencement of the reaction sulphur nitride freed of ammonium chloride, in an amount equivalent to about 2 to 4% by weight of the chloride of sulphur.

10. In a process for the production of mixtures containing sulphur nitride by reacting ammonia with a chloride of sulphur containing more than 65% by weight of chlorine in an organic liquid saturated with the products of a previous reaction between ammonia and a chloride of sulphur, the step of incorporating in the reaction mixture before commencement of the reaction sulphur nitride in an amount equivalent to about 2 to 4% by weight of the chloride of sulphur.

11. A process according to claim 9 in which the organic liquid is carbon tetrachloride.

12. A process according to claim 10 in which the organic liquid is carbon tetrachloride.

MICHAEL HENRY MILLER ARNOLD.
WILLIAM ERIC PERRY.